(12) United States Patent
Lan et al.

(10) Patent No.: US 6,376,591 B1
(45) Date of Patent: Apr. 23, 2002

(54) HIGH BARRIER AMORPHOUS POLYAMIDE-CLAY INTERCALATES, EXFOLIATES, AND NANOCOMPOSITE AND A PROCESS FOR PREPARING SAME

(75) Inventors: Tie Lan, Lake Zurich; Vasiliki Psihogios, Palatine, both of IL (US); Sam Richard Turner, Kingsport; Gary Wayne Connell, Church Hill, both of TN (US); James Christopher Matayabas, Jr., Phoenix, AZ (US); John Walker Gilmer, Kingsport, TN (US)

(73) Assignee: Amcol International Corporation, Arlington Heights, IL (US)

( * ) Notice: Subject to any disclaimer, the term of this patent is extended or adjusted under 35 U.S.C. 154(b) by 0 days.

(21) Appl. No.: 09/452,511

(22) Filed: Dec. 1, 1999

Related U.S. Application Data
(60) Provisional application No. 60/111,284, filed on Dec. 7, 1998.

(51) Int. Cl.$^7$ ................................................ C08K 3/34
(52) U.S. Cl. ........................ 524/445; 524/186; 524/447; 501/148
(58) Field of Search ................................ 428/333, 338, 428/339; 501/148; 523/210; 524/445, 446, 447

(56) References Cited

U.S. PATENT DOCUMENTS

| | | | |
|---|---|---|---|
| 3,419,460 A | 12/1968 | Ure | 161/162 |
| 3,419,517 A | 12/1968 | Hedrick et al. | 260/37 |
| 3,515,626 A | 6/1970 | Duffield | 161/162 |
| 3,795,650 A | 3/1974 | Burns | 260/33.4 R |
| 3,843,479 A | 10/1974 | Matsunami et al. | 161/165 |
| 3,912,532 A | 10/1975 | Simone | 106/308 N |
| 3,929,849 A | 12/1975 | Oswald | 260/448 |
| 4,018,746 A * | 4/1977 | Brinkmann et al. | 260/78 |
| 4,053,493 A | 10/1977 | Oswald | 260/448 |
| 4,125,411 A | 11/1978 | Lyons | 106/291 |
| 4,133,802 A | 1/1979 | Hachiboshi et al. | 528/502 |
| 4,136,103 A | 1/1979 | Oswald | 260/448 |
| 4,210,572 A | 7/1980 | Herman et al. | 260/404 |
| 4,251,576 A | 2/1981 | Osborn et al. | 428/331 |
| 4,398,642 A | 8/1983 | Okudaira et al. | 251/1 C |
| 4,434,075 A | 2/1984 | Mardis et al. | 252/315.2 |
| 4,472,538 A | 9/1984 | Kamigaito et al. | 523/202 |
| 4,500,670 A | 2/1985 | McKinley et al. | 524/445 |
| 4,546,126 A | 10/1985 | Breitenfellner et al. | 523/216 |
| 4,546,145 A | 10/1985 | Kishida et al. | 524/780 |
| 4,600,744 A | 7/1986 | Libor et al. | 524/446 |
| 4,613,542 A | 9/1986 | Alexander | 428/290 |
| 4,624,982 A | 11/1986 | Alexander | 524/446 |
| 4,676,929 A | 6/1987 | Rittler | 252/315.2 |
| 4,739,007 A | 4/1988 | Okada et al. | 524/789 |
| 4,777,206 A | 10/1988 | Rittler | 524/445 |
| 4,789,403 A | 12/1988 | Rice | 106/417 |
| 4,798,766 A | 1/1989 | Rice | 428/404 |
| 4,810,734 A * | 3/1989 | Kawasumi et al. | 523/216 |
| 4,842,651 A | 6/1989 | Ravet et al. | 106/487 |
| 4,849,006 A | 7/1989 | Knudson, Jr. | 71/64.11 |
| 4,875,762 A | 10/1989 | Kato et al. | 350/357 |
| 4,889,885 A | 12/1989 | Usuki et al. | 524/443 |
| 4,894,411 A | 1/1990 | Odada et al. | 524/710 |
| 4,956,121 A | 9/1990 | Tymon et al. | 252/378 R |
| 4,983,719 A | 1/1991 | Fox et al. | 528/339 |
| 5,028,351 A | 7/1991 | Kato et al. | 252/315.2 |
| 5,028,462 A | 7/1991 | Matlack et al. | 428/35.7 |
| 5,032,546 A | 7/1991 | Giannelis et al. | 501/3 |
| 5,032,547 A | 7/1991 | Giannelis et al. | 501/3 |
| 5,091,462 A | 2/1992 | Fukui et al. | 524/504 |
| 5,102,948 A * | 4/1992 | Deguchi et al. | 524/789 |
| 5,164,440 A | 11/1992 | Deguchi et al. | 524/444 |
| 5,164,460 A | 11/1992 | Yano et al. | 624/445 |
| 5,204,078 A | 4/1993 | Tateyama et al. | 423/331 |
| 5,206,284 A | 4/1993 | Fukui et al. | 524/504 |
| 5,229,451 A | 7/1993 | Carter et al. | 524/493 |
| 5,248,720 A | 9/1993 | Deguchi et al. | 524/444 |
| 5,326,500 A | 7/1994 | Friedman et al. | 252/378 |
| 5,340,558 A | 8/1994 | Friedman et al. | 423/328.1 |
| 5,385,776 A | 1/1995 | Maxfield et al. | 428/297 |
| 5,391,437 A | 2/1995 | Miyasaka et al. | 528/425.5 |
| 5,414,042 A | 5/1995 | Yasue et al. | 524/789 |
| 5,428,094 A | 6/1995 | Tokoh et al. | 524/379 |
| 5,506,046 A | 4/1996 | Andersen et al. | 524/446 |
| 5,508,072 A | 4/1996 | Andersen et al. | 524/446 |

(List continued on next page.)

FOREIGN PATENT DOCUMENTS

| | | |
|---|---|---|
| CA | 2209671 | 1/1998 |
| DE | 1 642 122 | 7/1970 |
| DE | 38 08 623 A1 | 10/1988 |
| DE | 281 585 A5 | 8/1990 |
| EP | 0 205 281 A3 | 12/1986 |
| EP | 0 278 403 A2 | 8/1988 |
| EP | 0 335 653 A1 | 10/1989 |

(List continued on next page.)

OTHER PUBLICATIONS

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

(List continued on next page.)

Primary Examiner—Edward J. Cain
Assistant Examiner—Katarzyna W. Lee
(74) Attorney, Agent, or Firm—Marshall, Gerstein & Borun

(57) ABSTRACT

This invention is directed to a polyamide-clay nanocomposite, products produced from the nanocomposite, and a process for preparing a polyamide-clay nanocomposite. The polyamide-clay nanocomposite comprises (a) an amorphous matrix polyamide comprising (i) a residue of a dicarboxylic acid component comprising at least two diacids and (ii) a residue of a diamine component, and (b) a layered clay material, wherein the layered clay material is dispersed in the matrix polyamide.

40 Claims, No Drawings

U.S. PATENT DOCUMENTS

| | | | |
|---|---|---|---|
| 5,514,734 A | 5/1996 | Maxfield et al. | 523/204 |
| 5,552,469 A * | 9/1996 | Beall et al. | 524/445 |
| 5,554,670 A | 9/1996 | Giannelis et al. | 523/209 |
| 5,578,672 A | 11/1996 | Beall et al. | 624/446 |
| 5,667,886 A | 9/1997 | Gough et al. | 428/331 |
| 5,698,624 A | 12/1997 | Beall et al. | 524/445 |
| 5,721,306 A | 2/1998 | Tsipursky et al. | 524/449 |
| 5,730,996 A | 3/1998 | Beall et al. | 424/405 |
| 5,747,403 A | 5/1998 | Boyd et al. | 502/62 |
| 5,747,560 A | 5/1998 | Christiani et al. | 523/209 |
| 5,760,106 A | 6/1998 | Pinnavaia et al. | 523/209 |
| 5,760,121 A | 6/1998 | Beall et al. | 524/450 |
| 5,766,751 A | 6/1998 | Kotani et al. | 428/323 |
| 5,801,216 A | 9/1998 | Pinnavaia et al. | 523/209 |
| 5,804,613 A | 9/1998 | Beall et al. | 523/200 |
| 5,830,528 A | 11/1998 | Beall et al. | 427/220 |
| 5,837,763 A | 11/1998 | Ferraro et al. | 524/449 |
| 5,844,032 A | 12/1998 | Serrano et al. | 524/445 |
| 5,849,830 A | 12/1998 | Tsipursky et al. | 524/450 |
| 5,853,886 A | 12/1998 | Pinnavaia et al. | 428/403 |
| 5,877,248 A | 3/1999 | Beall et al. | 524/450 |
| 5,880,197 A | 3/1999 | Beall et al. | 524/445 |
| 5,910,523 A | 6/1999 | Hudson | 523/213 |
| 5,952,095 A | 9/1999 | Beall et al. | 428/332 |
| 5,955,094 A | 9/1999 | Beall et al. | 424/405 |
| 5,981,029 A | 11/1999 | Harada et al. | 428/143 |
| 5,994,445 A | 11/1999 | Kaschel et al. | 524/444 |
| 5,998,528 A | 12/1999 | Tsipursky et al. | 524/445 |
| 6,034,163 A | 3/2000 | Barbee et al. | 524/445 |
| 6,050,509 A | 4/2000 | Clarey et al. | 241/21 |
| 6,057,396 A | 5/2000 | Lan et al. | 524/445 |
| 6,071,988 A | 6/2000 | Barbee et al. | 523/210 |
| 6,083,559 A | 7/2000 | Beall et al. | 427/220 |
| 6,084,019 A | 7/2000 | Matayabas, Jr. et al. | 524/445 |
| 6,090,734 A | 7/2000 | Tsipursky et al. | 501/141 |
| 6,124,365 A | 9/2000 | Lan et al. | 516/101 |
| 6,126,734 A | 10/2000 | Beall et al. | 106/487 |

FOREIGN PATENT DOCUMENTS

| | | |
|---|---|---|
| EP | 0 358 415 A1 | 3/1990 |
| EP | 0 479 031 A1 | 4/1992 |
| EP | 0 548 940 A1 | 6/1993 |
| EP | 0 619 182 A1 | 10/1994 |
| EP | 0 645 181 A2 | 3/1995 |
| EP | 0 747 451 A2 | 12/1996 |
| EP | 0 761 739 A1 | 3/1997 |
| EP | 0 780 340 A1 | 6/1997 |
| EP | 0 818 508 A2 | 1/1998 |
| GB | 1 146 668 | 3/1969 |
| GB | 1 565 362 | 4/1980 |
| GB | 2 088 932 A | 6/1982 |
| JP | 1156/75 | 1/1975 |
| JP | 5735/75 | 3/1975 |
| JP | 5751/75 | 3/1975 |
| JP | 10196/75 | 4/1975 |
| JP | 95529697 | 5/1995 |
| JP | 9-176461 | 7/1997 |
| WO | WO 93/04117 | 3/1993 |
| WO | WO 93/04118 | 3/1993 |
| WO | WO 93/11190 | 6/1993 |
| WO | WO 96/08526 | 3/1996 |
| WO | WO 98/01346 | 1/1998 |

OTHER PUBLICATIONS

K. Suzuki et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R. A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvation Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By εCaprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32, (1994), pp. 625–630.

B.K.G. Theng, "Clay–Polymer interactions: SumGomary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", *Materials Research Society Symposium Proceedings*, vol. 249 (1992), pp. 547–558.

Sanchez Camazano, M. et al., "Factors influencing interactions of organophosphorus pesticides with montmorillonite", *Chemical Abstracts*, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", *Polym. Mater. Sc. Eng.*, 73, pp. 296–297 (1995).

Y. Fukushima et al., "Synthesis of an Intercalated Compound of Montmorillonite and 6–Polyamide", *Journal of Inclusion Phenomena* 5 (1987), pp. 473–482.

Y. Fukushima, et al., "Swelling Behaviour of Montmorillonite by Poly–6–Amide", *Clay Minerals* (1988) 23, pp. 27–34.

A. Okada, et al., "Synthesis and Characterization of a Nylon 6–Clay Hybrid", *Polymer Preprints*, 28 (Aug. 1987), pp. 447–448.

* cited by examiner

HIGH BARRIER AMORPHOUS POLYAMIDE-CLAY INTERCALATES, EXFOLIATES, AND NANOCOMPOSITE AND A PROCESS FOR PREPARING SAME

CROSS-REFERENCE TO RELATED APPLICATION

This application claims priority to, provisional patent application Serial No. 60/111,284, filed Dec. 7, 1998, which is incorporated herein by reference in its entirety.

FIELD OF THE INVENTION

This invention relates generally to a nanocomposite comprising at least one high barrier amorphous matrix polymer resin, preferably amorphous polyamide, and a clay material uniformly dispersed therein. This invention also relates to articles produced from the nanocomposite and a process for producing the nanocomposite.

BACKGROUND OF THE INVENTION

Thermoplastic materials are being increasingly used in the packaging of beverages and perishable foods. Plastics are often the material of choice for food and beverage packaging because of their clarity, flexibility, toughness, high gas barrier, light weight, processability and high gloss.

Many high barrier semi-crystalline polyamides exist and one, the polyamide based on m-xylylenediamine and adipic acid, is commercially available from Mitsubishi Gas and Chemical Company under the name MXD6. These crystalline polymers have been found to possess high barrier to oxygen and carbon dioxide. Polyamides such as the one based on m-xylylenediamine and adipic acid have found utility in packaging oxygen sensitive foodstuffs, especially as the center layer in a tri-layer stretch blow molded container or a tri-layer extruded film.

Amorphous polyamides have been prepared and proposed as polymers for food packaging, offering improved resistance to whitening or hazing upon exposure to moisture, as described in U.S. Pat. Nos. 5,028,462 and 4,983,719, and offering improved physical properties, as described in U.S. Pat. No. 4,018,746. However, these patents do not disclose or suggest incorporating a clay material into such amorphous polyamide to improve the barrier of the polyamide or an article made therefrom. Further, these patents do not disclose or suggest that haze would be reduced in a composite comprising a clay material and an amorphous polyamide.

The principle of utilizing a layered clay to enhance or improve the properties of a polymer matrix in which the clay has been dispersed is well established. U.S. Pat. No. 4,739,007 describes the use of a composite material comprising a polyamide matrix and well-dispersed silicate layers exhibiting high mechanical strength and excellent high temperature properties. Additional publications describing polymer nanocomposites comprising a polyamide matrix and dispersed layers of silicate include U.S. Pat. No. 4,810,734; German Patent 3808623; *J. Inclusion Phenomena* 5, (1987), 473–485; *Clay Minerals*, 23, (1988) 27; *Polymer Preprints*, 3, (April 1991), 65–66; and *Polymer Preprints*, 28, (August 1987), 447–448.

Multilayer materials for packaging are known for film, bottles, and other containers. Multilayer injection molded preforms described, for example, in European Patent Application 0 278 403 A2 and U.S. Pat. No. 4,398,642, contain an outer thermoplastic layer to impart excellent overall properties to the material and an inner layer of thermoplastic resin possessing excellent gas-barrier properties. Molded containers produced from these multilayer preforms have potential advantages in regards to handling, safety, and the cost of production. However, processing multilayer containers usually involves additional and time-consuming steps.

It is often desirable to include a dispersed clay in an inner or center layer of a multilayer article comprising a high barrier polyamide such as the one based on m-xylylenediamine and adipic acid. The use of these clays in matrix polymers of the inner layer a multilayer container may reduce the haze of multilayer structures and improve the appearance of oriented films and molded articles, including bottles.

However, clay particles in a nylon-6 nanocomposite, for example, induce crystallization, as described in U.S. Pat. No. 5,385,776. Without being bound by any particular theory, it is believed that the polymer/clay nanocomposite on processing, such as stretching or orientation of the films, leads to very high levels of haze from crystallization of the matrix polymer around the dispersed particles which renders the polymer nanocomposites undesirable for food packaging application. This crystallization phenomena can even lead to void and hole formation in the polymer films, which destroys the usefulness of these compositions in barrier applications.

Thus, there remains a need in the art for an amorphous polyamide nanocomposite having reduced haze. There is also a need for oriented monolayer and/or multilayer structures comprising this amorphous polyamide nanocomposite. Moreover, there is a need for a process capable of introducing clay material having substantially separated platelet particles to an amorphous polyamide to produce a nanocomposite having improved barrier properties and good clarity.

SUMMARY OF THE INVENTION

The invention relates generally to amorphous high barrier polyamides, and more particularly to polyamide nanocomposites comprising a high barrier amorphous polyamide and a clay material. These amorphous polyamides show unexpected resistance to haze formation, crystallization, and other defect formation in the presence of dispersed, treated or organically modified clays when undergoing orientation and other film processing steps.

As embodied and broadly described herein, this invention, in one embodiment, relates to a polyamide-clay nanocomposite comprising (a) an amorphous matrix polyamide comprising (i) a residue of a dicarboxylic acid component comprising at least two diacids and (ii) a residue of a diamine component, and (b) a layered clay material, wherein the layered clay material is dispersed in the matrix polyamide.

In another embodiment, this invention relates to a polyamide-clay nanocomposite comprising (a) an amorphous matrix polyamide comprising (i) a residue of a dicarboxylic acid component comprising at least two diacids and (ii) a residue of a diamine component, and (b) a layered clay material, wherein the layered clay material is dispersed in an amorphous matrix polyamide-compatible oligomeric resin and wherein the clay-oligomer resin dispersion is incorporated into the matrix polyamide.

In yet another embodiment, this invention relates to a process for preparing an amorphous polyamide-clay nanocomposite comprising the steps of: (i) melt mixing a clay material with a matrix polymer-compatible oligomeric resin to form an oligomeric resin-clay composite, and (ii) mixing the oligomeric resin-clay composite with a high molecular weight amorphous matrix polyamide comprising (i) a residue of a dicarboxylic acid component comprising at least two diacids and (ii) a residue of a diamine component, thereby increasing the molecular weight of the oligomeric resin-clay composite and producing a nanocomposite material.

In yet another embodiment, this invention relates to a process for preparing an amorphous polyamide-clay nanocomposite comprising the steps of (a) adding a clay material to a mixture of (i) a dicarboxylic acid component comprising at least two diacids and (ii) a diamine component of an amorphous polyamide, and (b) conducting the polycondensation polymerization of components (i) and (ii) in the presence of the clay material.

Additional advantages of the invention will be set forth in part in the detailed description, including the figures, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Definitions

It must also be noted that, as used in the specification and the appended claims, the singular forms "a," "an" and "the" include plural referents unless the context clearly dictates otherwise. For example, reference to an "article," "container" or "bottle" prepared from the nanocomposite and process of this invention is intended to include the processing of a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Whenever used in this specification, the terms set forth shall have the following meanings:

"Layered clay material," "layered clay," "layered material" or "clay material" shall mean any organic or inorganic material or mixtures thereof, such as a smectite clay mineral, which is in the form of a plurality of adjacent, bound layers. The layered clay comprises platelet particles and is typically swellable. "Platelets," "platelet particles" or "particles" shall mean individual or aggregate unbound layers of the layered material. These layers may be in the form of individual platelet particles, ordered or disordered small aggregates of platelet particles (tactoids), and/or small aggregates of tactoids.

"Dispersion" or "dispersed" is a general term that refers to a variety of levels or degrees of separation of the platelet particles. The higher levels of dispersion include, but are not limited to, "intercalated" and "exfoliated."

"Intercalated" or "intercalate" shall mean a layered clay material that includes treated or organically modified layered clay material having an increase in the interlayer spacing between adjacent platelets particles and/or tactoids.

"Exfoliate" or "exfoliated" shall mean platelets dispersed mostly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite" shall mean a polymer or copolymer having dispersed therein a plurality of individual platelets obtained from a layered clay material.

"Matrix polyamide" or "matrix polymer" shall mean a thermoplastic or thermosetting amorphous polyamide in which the clay material is dispersed to form a nanocomposite.

Description of the Embodiments

The invention relates generally to amorphous high barrier matrix polyamides. These amorphous polyamides have been found to show unexpected resistance to haze formation, crystallization, and other defect formation in the presence of dispersed and/or exfoliated organically modified clays when undergoing orientation and/or other film processing steps.

The prior art has defined the degree of separation of clay (platelet particles) based on peak intensity and basal spacing value, or lack of predominant basal spacing, as determined by X-ray analyses of polymer-platelet particle composites. Even though X-ray analysis alone often does not unambiguously predict whether the platelet particles are individually dispersed in the polymer, it can often allow quantification of the level of dispersion achieved. Basal spacing by X-ray diffraction indicates the separation distance of a platelet in a tactoid rather than single platelets. X-ray diffraction intensity (basal spacing peak height) may correlate to barrier in an article resulting from a nanocomposite including a clay material. For example, a low basal spacing peak height indicates few tactoids; therefore, the remainder must be either individual platelets or tactoids that are disordered.

Moreover, in polymer nanocomposites, X-ray analysis alone does not accurately predict either the dispersion of the platelet particles in the polymer or the resultant gas barrier improvement. TEM images of polymer-platelet composites show that platelet particles which are incorporated into at least one polymer exist in a variety of forms, including, but not limited to, individual platelets (the exfoliated state), disordered agglomerates of platelets, well ordered or stacked aggregates of platelets (tactoids), swollen aggregates of stacked platelets (intercalated tactoids), and aggregates of tactoids.

Without being bound by any particular theory, it is believed that the degree of improved gas barrier (permeability) depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the platelet particles representative of the bulk of the composite be exfoliated, and preferably be highly exfoliated, in the matrix polymer such that the majority, preferably at least about 75 percent and perhaps as much as at least about 90 percent or more of the platelet particles, be dispersed in the form of individual platelets and small aggregates having a thickness in the shortest dimension of less than about 30 nm and preferably less than about 10 nm, as estimated from TEM images. Polymer-platelet nanocormposites containing more individual platelets and fewer aggregates, ordered or disordered, are most preferred.

Significant levels of incomplete dispersion (i.e., the presence of large agglomerates and tactoids greater than about 30 nm) not only lead to an exponential reduction in the potential barrier improvements attributable to the platelet particles, but also can lead to deleterious affects to other properties inherent to polymer resins such as strength, toughness, and heat resistance, and processability.

Again, without being bound by a particular theory, it is believed that delamination of platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which are accessible to a polymer chain when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing.

Moreover, as described above, clay particles in a nylon-6 nanocomposite, for example, induce crystallization. Without being bound by any particular theory, it is believed that the polymer/clay nanocomposite on processing, such as stretching or orientation of the films, leads to very high levels of haze from crystallization of the matrix polymer around the dispersed particles which renders the polymer nanocomposites undesirable for food packaging application. This crystallization phenomena can even lead to void and hole formation in the polymer films, which destroys the usefulness of these compositions in barrier applications.

Regarding the present invention, it has been found that processing an amorphous polyamide with a layered clay material gives a good dispersion of platelet particles in a resulting polyamide nanocomposite, creating mostly individual platelet particles. The resulting nanocomposite has improved barrier to gas when formed into a wall or article compared to a neat polyamide formed into the same or similar structure. In addition, these amorphous polyamides have been found to show unexpected resistance to haze formation, crystallization, and other defect formation in the presence of dispersed and/or exfoliated organically modified clays when undergoing orientation and/or other film processing steps.

In one embodiment, this invention relates to a polyamide-clay nanocomposite comprising an amorphous polyamide and up to about 25 weight percent of a mixture of swellable layered clay material, which may in turn be intercalated (organically modified) with an organic cation, preferably an onium ion. The intercalated clay material mixture comprises platelet particles, which are dispersed in the polyamide.

Polyamides

The amorphous polyamides of the present invention may comprise the polycondensation polymerization reaction product (or residue) of a diamine Component and at least one dicarboxylic acid component. "Residue," when used in reference to the components of the polyamide of this invention, refers to the moiety that is the resulting product of the chemical species in a particular reaction scheme, or subsequent formulation or chemical product, regardless of whether the moiety is actually obtained from the chemical species.

The dicarboxylic acid component comprise a first diacid and preferably a second diacid. The diacids may be in any ratio of mole percent of the total diacid moieties present in the polyamide. Preferably, one of the diacids is present in an amount of about 10 to about 90 mole percent of the total diacid moieties present in the polyamide, more preferably of about 45 to about 85 and even more preferably about 50 to about 80 mole percent of the total diacid moieties present in the polyamide.

The dicarboxylic acids of this invention include, but are not limited to dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, and/or cycloaliphatic dicarboxylic acids preferably having 8 to 12 carbon atoms.

In one embodiment, the diacid component may be defined by formula (I):

$$HO_2CCH_2X(RX)_yCH_2CO_2H \qquad (I)$$

wherein X is —O—, —S—, or

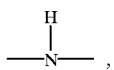

Y is 0 or 1, and R is an aromatic moiety comprising 6 to about 13 carbon atoms. Suitable R groups include, but are not limited to the following:

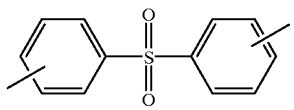

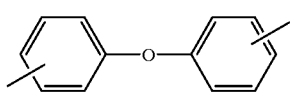

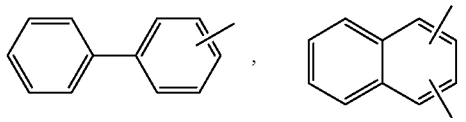

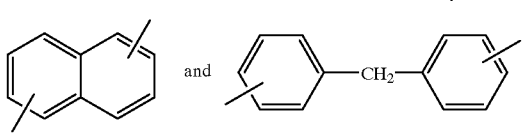

Preferably, in the embodiment as defined by formula (I), the dicarboxylic acid component comprises iminodiacetic acid, oxydiacetic acid, thiodiacetic acid, 1,4phenylenedioxydiacetic acid, 1,3- phenylenedioxydiacetic acid, etc., or mixtures thereof.

Examples of further suitable dicarboxylic acids include, but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi(oxyacetic acid), sebacic acid, succinic acid, adipic acid, glutaric acid, azelaic acid, and the like.

The diamine component comprises an aliphatic diamine having about 2 to about 12 carbon atoms. The aliphatic diamines may contain aromatic groups, as long as an alkylene group (e.g., a methylene group) is interposed between an amino group and an aromatic ring. The aliphatic diamines also include cycloaliphatic diamines such as piperazine. Examples of suitable aliphatic diamines include, but are not limited to 1,2-ethylenediamine, 1,3-propylenediamine, 1,6-hexamethylenediamine, 1,12-dodecylenediamine, 1,4-cyclohexanebismethylamine, piperazine, p-xylylenediamine, m-xylylenediamine, or mixtures thereof The diamine component of this invention preferably comprises m-xylylenediamine.

Other diamines or mixtures of diamines can also be used with the preferred diamine (m-xylylenediamine) to form the amorphous polyamide. Some representative polyamides of this invention include, but are not limited to those shown in Table 1.

TABLE 1

| Example | Polyamide | I.V. | $T_g$ (° C.) | $T_m$ (° C.) |
|---|---|---|---|---|
| 1 | PDA(MX) | 0.522 | 96.7 | none |
| 2 | PDA-10-TPA(MX) | 0.403 | 101.1 | none |
| 3 | PDA-10-NDA(MX) | 0.390 | 101.1 | none |
| 4 | A-19-IPA(MX) | 0.828 | 104.1 | none |
| 5 | A-18-TPA(MX) | 0.778 | 103.8 | none |
| 6 | A-18-NDA(MX) | 0.798 | 106.3 | none |
| 7 | A-19-PIDA(MX) | 0.498 | 109.6 | none |

The preferred amorphous high barrier matrix polyamides of this invention comprise the reaction product or residue of a dicarboxylic acid component comprising at least two of adipic acid (A), 2,6-napthalene dicarboxylic acid NDA), isophthalic acid (IPA), terephthalic acid (TPA), 1,3-phenylenedoxydiacetic acid (PDA), 1,4-cyclohexanedicarboxylic acid (CHDA), and phenylindane dicarboxylic acid (PIDA), and a diamine component comprising m-xylylenediamine (MX). The combination of at least two of the diacids with the diamine effectively disrupts the crystallization tendency of these macromolecules to allow clear transparent amorphous structures to be maintained throughout the processing steps. Using more than one diamine with one diacid may form an amorphous polyamide. Also, using more than one diacid and more than one diamine may form an amorphous polyamide. MX is the preferred diamine due to its high barrier properties.

Referring to Table 1, PDA(MX) means 100 mol % PDA with 100 mol % MX; PDA-10-TPA(MX) means 90 mol % PDA and 10 mol % TPA with 100 mol % MX; PDA-10-NDA(MX) means 90 mol % PDA and 10 mol % NDA with 100 mol % MX; A-19-IPA(MX) means 81 mol % A and 19 mol % IPA with 100 mol % MX; A-18-TPA(MX) means 82 mol % A and 18 mol % TPA with 100 mol % NM; A-18-NDA(MX) means 82 mol % A and 18 mol % NDA with 100 mol % MX; A-18-PID(MX) means 82 mol % A and 18 mol % PIDA with 100 mol % MX.

"Amorphous", as used for this invention, means that the polyamide does not show a melting on crystallization peak on a second DSC scan at a rate of 20° C./min. Generally, an amorphous polymer and/or polymer composition is characterized by a high degree of transparency (clarity) and a lack of a sharply defined melting point. The polyamides as shown in Table 1 do not have a defined melting point ($T_m$). After forming a nanocomposite of this invention, some of the compositions may have a minor melting point with ΔH less than 0.5 cal/g due to the nucleating effect of the clay, as shown in Example 4.

Although the preferred polyamides are linear or nearly linear, polyamides with other architectures, including branched, star, cross-linked and dendritic structures, may be used if desired.

The polyamides of the present invention exhibit an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/tetrachloroethane at a concentration of 0.5 grams per 100 ml. Polyamides having an I.V. within the ranges specified above are of sufficiently high molecular weight to be used in the formation of the articles of the present invention.

The amorphous polyamides of the present invention are synthesized by methods generally known in the art for producing polyamides. The diamine and diacid components are preferably reacted in approximately stoichiometric quantities. Diacid chlorides, esters, etc., can suitably be used. A solvent may be used in the preparation of the polyamide.

Although not necessarily preferred, the polyamides of the present invention may also include suitable additives normally used in polymers. Such additives may be employed in conventional amounts and may be added directly to the reaction forming the polyamide or to the final polymer. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

Clay Materials (Platelet Particles)

The nanocomposite composition of the present invention comprises less than about 25 weight percent, preferably from about 0.5 to about 20 weight percent, more preferably from about 0.5 to about 15 weight percent, and most preferably from about 0.5 to about 10 weight percent of clay material. The clay material comprises platelet particles. The amount of platelet particles is determined by measuring the amount of silicate residue in the ash of the polymer/platelet composition when treated in accordance with ASTM D5630-94.

Useful clay materials include natural, synthetic, and modified phyllosilicates. Natural clays include smectite clays, such as montmorillonite, saponite, hectorite, mica, vermiculite, bentonite, nontronite, beidellite, volkonskoite, magadite, kenyaite, and the like. Synthetic clays include synthetic mica, synthetic saponite, synthetic hectorite, and the like. Modified clays include fluoronated montmorillonite, fluoronated mica, and the like. Suitable clays are available from various companies including Nanocor, Inc., Southern Clay Products, Kunimine Industries; Ltd., and Rheox.

Generally, the layered clay materials useful in this invention are an agglomeration of individual platelet particles that are closely stacked together like cards, in domains called tactoids. The individual platelet particles of the clays preferably have thickness of less than about 2 nm and diameter in the range of about 10 to about 3000 nm.

Preferably, the clays are dispersed in the polyamide so that most of the clay material exists as individual platelet particles, small tactoids, and small aggregates of tactoids. Preferably, a mojority of the tactoids and aggregates in the polyamide/clay nanocomposites of the present invention will have thickness in its smallest dimension of less than about 20 nm. Polyamide/clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 milliequivalents per gram of mineral (meq/g), preferably from about 0.90 to about 1.5 meq/g, and more preferably from about 0.95 to about 1.25 meq/g. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the, cations may be exchanged for organic cations (onium ions). The exchange may occur by treating a individual clay or a mixture of clays with organic cations.

Preferred clay materials are phyllosilicates of the 2:1 type having a cation exchange capacity of 0.5 to 2.0 meq/g. The most preferred clay materials are smectite clay minerals, particularly bentonite or montmorillonite, more particularly Wyoming-type sodium montmorillonite or Wyoming-type sodium bentonite having a cation exchange capacity from about 0.95 to about 1.25 meq/g.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

Improvements in gas barrier result from increases in the concentration of platelet particles in the polymer. While amounts of platelet particles as low as 0.01 percent provide improved barrier (especially when well dispersed and ordered), compositions having at least about 0.5 weight percent of the platelet particles are preferred because they display the desired improvements in gas permeability.

Prior to incorporation into the polyamide, the particle size of the clay material is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

The clay material of this invention may comprise refined but unmodified clays, modified clays or mixtures of modified and unmodified, clays. Generally, it is desirable to treat the selected clay material to facilitate separation of the agglomerates of platelet particles to individual platelet particles and small tactoids. Separating the platelet particles prior to incorporation into the polymer also improves the polymer/platelet interface. Any treatment that achieves the above goals may be used. Many clay treatments used to modify the clay for the purpose of improving dispersion of clay materials are known and may be used in the practice of this invention. The clay treatments may be conducted prior to, during, or after mixing the clay material with the polyamide.

Organic Cations

In an embodiment of this invention, an intercalated layered clay material is prepared by the reaction of a swellable layered clay with an organic cation, preferably an ammonium compound (to effect partial or complete cation exchange). If desired, two or more organic cations may be used to treat a clay. Moreover, mixtures of organic cations may also be used to prepare ant intercalated layered clay material, wherein the intercalated layered clay material in a polyamide nanocomposite comprises a mixture of intercalated clays. The process to prepare the organoclays (intercalated clays) may be conducted in a batch, semi-batch, or continuous manner.

Organic cations used to intercalate a clay material or a mixture of clay materials of a nanocomposite of this invention are derived from organic cation salts, preferably onium salt compounds. Organic cation salts useful for the nanocomposite and process of this invention may generally be represented by the following formula (I):

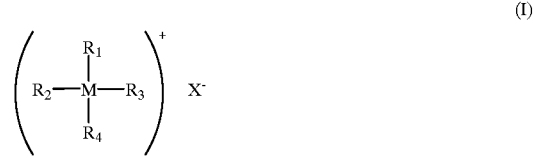

wherein M is either nitrogen or phosphorous; X⁻ is a halide, hydroxide, or acetate anion, preferably chloride and bromide, and $R_1$, $R_2$, $R_3$, and $R_4$ are independently organic and/or oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to poly(alkylene oxide), polystyrene, polyacrylate, polycaprolactone, and the like.

Examples of useful organic cations include, but are not limited to alkyl ammonium ions, such as tetramethyl ammonium, hexyl ammonium, butyl ammonium, bis(2-hydroxyethyl)dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include but are not limited to alkyl ammonium ions such as dodecyl ammonium, octadecyl trimethyl ammonium, bis(2-hydroxyethyl)octadecyl methyl ammonium, octadecyl benzyl dimethyl ammonium, and the like or mixtures thereof.

Illustrative examples of suitable polyalkoxylated ammonium compounds include the hydrochloride salts of poly-alkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15])ammonium chloride, wherein the numbers in brackets refer to the total number of ethylene oxide units.

Numerous methods to modify layered clays with organic cations are known, and any of these may be used in the practice of this invention. One embodiment of this invention is the organic modification of a layered clay with an organic cation salt by the process of dispersing a layered clay or mixture of clays into hot water, mostly from 50 to 80° C., adding the organic cation salt separately or adding a mixture of the organic cation salts (neat or dissolved in water or alcohol) with agitation, then blending for a period of time sufficient for the organic cations to exchange most of the metal cations present in the galleries between the layers of the clay material(s). Then, the organically modified layered clay material(s) is isolated by methods known in the art including, but not limited to, filtration, centrifugation, spray drying, and their combinations.

It is desirable to use a sufficient amount of the organic cation salt(s) to permit exchange of most of the metal cations in the galleries of the layered particle for the organic cation(s); therefore, at least about 0.5 equivalent of total organic cation salts is used and up to about 3 equivalents of organic cation salts can be used. It is preferred that about 0.5 to 2 equivalents of organic cation salts be used, more preferable about 1.0 to 1.5 equivalents. It is desirable, but not required to remove most of the metal cation salts and most of the excess organic cation salts by washing and other techniques known in the art.

Other Clay Treatments

The clay may be further treated for the purposes of aiding exfoliation in the composite and/or improving the strength of the polyamide/clay interface. Any treatment that achieves the above goals may be used. Examples of useful treatments include intercalation with water-soluble or water-insoluble polymers, organic reagents or monomers, silane compounds, metals or organometallics, and/or their combinations. Treatment of the clay can be accomplished prior to the addition of a polyamide to the clay material mixture, during the dispersion of the clay with the polyamide or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the clay material include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy(polyethyleneoxy)propyl heptamethyl trisiloxane, octadecyl dimethyl (3-trimethoxysilylpropyl) ammonium chloride and the like.

If desired, a dispersing aid may be present during or prior to the formation of the composite by melt mixing for the purposes of aiding exfoliation of the treated or untreated swellable layered particles into the polyamide. Many such dispersing aids are known, covering a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 8 times the amount of the platelet particles.

Articles

The polyamide-clay nanocomposites of this invention may be formed into articles by conventional plastic processing techniques. Molded articles may be made from the above-described polyamides by compression molding, blow molding, or other such molding techniques, all of which are known in the art. Monolayer and/or multilayer articles prepared from the nanocomposite material of this invention include, but are not limited to: film, sheet, pipes, tubes, profiles, molded articles, preforms, stretch blow molded films and containers, injection blow molded containers, extrusion blow molded films and containers, thermoformed articles and the like. The containers are preferably bottles.

The bottles and containers of this invention provide increased shelf storage life for contents, including beverages and food that are sensitive to the permeation of gases. Articles, more preferably containers, of the present invention often display a gas transmission or permeability rate (oxygen, carbon dioxide, water vapor) of at least 10% lower (depending on clay concentration) than that of similar containers made from clay-free polymer, resulting in correspondingly longer product shelf life provided by the container. Desirable values for the sidewall modulus and tensile strength may also be maintained. The articles also show unexpected resistance to haze formation, crystallization, and other defect formation.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments, it is prefixed that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment, co-extruding a layer of the polyamide-clay nanocomposite specified above with some other suitable thermoplastic resin may form articles. The polyamide-clay nanocomposite and the molded article and/or extruded sheet may also be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the polyamide-clay nanocomposite layer being sandwiched between two outer polymer layers, the source roughness is often considerably less than for a monolayer nanocomposite material. Thus, with a multilayer approach, the level of haze may be further reduced.

Processes

The amorphous polyamides of this invention may be processed with the clay material in different ways. In one embodiment, a suitable treated or modified sodium montmorillonite or other clay is melt processed or compounded into a high molecular weight version of the high barrier amorphous polyamide resulting in a polyamide-clay nanocomposite material. Melt processing includes melt and extrusion compounding. Use of extrusion compounding to mix the clay and the polymer presents advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin.

The nanocomposite may then be directly co-extruded as the center layer in a 3-layer package, either as an injected molded container preform or as an extruded film. Additional processing of stretch blow molding to a container or extruding as a barrier film yields transparent high barrier finished articles.

In another embodiment, the process of this invention comprises (i) preparing a low molecular weight version (oligomer) of the amorphous high barrier polyamide with either amino or diacid end groups by unbalancing the polymerization stoichiometry for the melt phase step-growth polycondensation, and (ii) melt mixing the oligomer with the clay material. The clay material is preferably treated or modified as described above. Such a low molecular weight oligomer is found to be very effective at dispersing an organo or other suitable modified clay, preferably smectic clay, as a concentrate when melt mixed. Desirable values for the I.V. or molecular weight of the oligomer depends on factors including the oligomer and clay selected and is readily determined by those skilled in the art.

The concentrate is then "let-down" in an extruder with MXD6 or one of the amorphous polyamides described above to form a nanocomposite blend that is then co-extruded into a preform as the center layer or into a barrier films, for example. The additional processing step of stretch blow molding into a container yields a transparent high barrier article.

Although any melt mixing device may be used, typically, the melt mixing step is conducted either by a batch mixing process or by a melt compounding extrusion process during which treated or untreated layered particles are introduced into an oligomeric resin. Prior to melt mixing, the treated or untreated layered particles may exist in various forms including pellets, flakes, chips and powder. It is preferred that the treated or untreated layered particles be reduced in size by methods known in the art, such as hammer milling and jet milling. Prior to melt mixing, the oligomeric resin may exist in wide variety of forms including pellets, ground chips, powder or its molten state.

The melt mixing step may also be achieved by dry mixing oligomeric resin with treated or untreated layered particles then passing the mixture through a compounding extruder under conditions sufficient to melt the oligomeric resin.

Further, the melt-mixing step may be conducted by feeding the oligomeric resin and treated or untreated layered particles separately in a compounding extruder. When treated layered particles are used in this process, it is preferred that the oligomeric resin be added first to minimize degradation of treated layered particles.

In yet another embodiment involving the melt mixing of an oligomer, a high concentration of layered particles is melt mixed with oligomeric resin by mixing in a reactor. The resulting composite material is then either chain extended, polymerized to high molecular weight, or let down in the extruder into a high molecular weight polyamide to obtain the final nanocomposite material.

In another embodiment of the melt mixing step, molten oligomeric resin may be fed directly to a compounding extruder along with treated or untreated layered particles to produce the oligomeric resin-clay nanocomposite.

The oligomeric resin and the high molecular weight amorphous polyamide may have the same or different repeat unit structure, i.e., may be comprised of the same or different monomer units. Preferably, the oligomeric resin has the same monomer unit to enhance compatibility or miscibility with the high molecular weight amorphous polyamide.

If desired, a dispersing aid may be present during or prior to the formation of the composite by melt mixing for the purposes of aiding exfoliation of the treated or untreated swellable layered particles into the polymer. Many such dispersing aids are known covering a wide range of materials including water, alcohols, ketones, aldehydes, chlorinated solvents, hydrocarbon solvents, aromatic solvents, and the like or combinations thereof.

A third embodiment of the process of this invention comprises (i) adding the modified clay to a mixture of the diacids and diamines of the desired polyamide and (ii) conducting the polycondensation polymerization in the presence of the clay. The molecular weight of the polymer material may be increased by any of a number of known approaches or by any combination of these approaches, e.g., chain extension, reactive extrusion, extrusion let-down, solid state polymerization or annealing, annealing under a flow of inert gas, vacuum annealing let-down in a melt reactor, etc.

The resulting nanocomposite can then be processed into the desired barrier film or container with the processing procedures described in the previous embodiments of the process of this invention.

Polymer nanocomposites produced according to the present invention display a gas permeability, which is at least 10 percent lower than that of the unmodified polymer.

EXAMPLES

The following examples and experimental results are included to provide those of ordinary skill in the art with a complete disclosure and description of particular manners in which the present invention can be practiced and evaluated, and are intended to be purely exemplar of the invention and are not intended to limit the scope of what the inventors regard as their invention.

Efforts have been made to ensure accuracy with respect to numbers (e.g., amounts, temperature, etc.); however, some errors and deviations may have occurred. Unless indicated otherwise, parts are parts by weight, temperature is in ° C. or is at ambient temperature, and pressure is at or near atmospheric.

Example 1

This example illustrates the preparation of an amorphous polyamide comprising 1,3-phenylenedioxydiacetic acid (PDA) with m-xylylenediamine (MX).

To a 500 ml round bottom flask equipped with a short distillation column, a stirred, and a nitrogen inlet was added 67.8 grams (0.3 moles) of resorcinol bis(carboxymethyl) ether [(1,3-phenlenedioxy)diacetic acid], 40.8 grams (0.30 moles) m-xylylenediamine, and 75.0 (4.17 moles) of water. The flask was purged of any oxygen present by reducing the vacuum to 100 mm and bleeding in nitrogen three times. The flask was immersed in a Belmont metal bath at 130° C. and stirred at 100 RPM. After 18 minutes, 20 ml of water was trapped in a condensation receiver and the reaction mixture was a white solid. The stirrer was stopped and the temperature was increased to 220° C. After 8 minutes, the temperature set point was increased to 275° C. After 19 minutes, the temperature was 265° C., melting of the reaction mixture had begun and the stirrer was started at 25 RPM. 50 ml of water had been trapped in a condensation receiver. After 17 minutes, the temperature was 275° C., ⅔ of the reaction mixture had melted and 60 ml of water had been trapped in a condensation receiver. After 8 minutes, almost all of the white solid was melted, the stirrer was increased to 100 RPM and the temperature set point was increased to 280° C. 62 ml of water had been trapped in a condensation receiver. After 5 minutes, all white solid had melted and the temperature was at 280° C. These conditions were held for 28 minutes. The stirring was reduced to 25 RPM and held for 2 minutes. The heat was removed and the polyamide was allowed to cool, removed from the flask and ground to pass a 3-mm screen. Analytical results: I.V.=0.52 dL/g; Tg=96.7° C. Color: L*=83.45, a*=0.72, b*=28.67; NMR confirmed the composition to be PDA(MX). Oxygen permeability of a compression molded film was 0.19 cc-ml/100 in$^2$-day-atm.

Example 2

Example 2 illustrates the preparation of a polyamide comprising 90 mol % 1,3-phenylenedioxydiacetic acid (PDA) and 20 mol % terephthalic acid (TPA) with m-xylylenediamine (MX).

61.02 grams (0.27 moles) of 1,3-phenylenedioxydiacetic acid, 4.98 grams (0.03 moles) of terephthalic acid, 40.8 grams (0.30 moles) m-xylylenediamine, and 75.0 g (4.17 moles) of water was added to a 500 ml round bottom flask equipped with a short distillation column, a stirrer, and a nitrogen inlet. The flask was immersed in a Belmont metal bath at 170° C. and stirred at 100 RPM. After 8 minutes, 35 ml of water was trapped in a condensation receiver and the reaction mixture was a white solid. The stirrer was stopped and the temperature was increased to 220° C. After 12 minutes, the temperature was increased to 275° C. and 52 ml of water was trapped in a condensation receiver. After 7 minutes, the temperature was 263° C., melting of the reaction mixture had begun and the stirrer was started at 25 RPM. 60 ml of water had been trapped in a condensation receiver. After 9 minutes, the temperature was 275° C. and ⅓ of the reaction mixture had melted and the stirrer was increased to 50 RPM. 70 ml of water had been trapped in a condensation receiver. After 9 minutes, almost all of the white solid was melted and the stirrer was increased to 100 RPM. 72 ml of water had been trapped in a condensation receiver. After 5 minutes, all the white solid had melted and the stirrer was reduced to 50 RPM. These conditions were held for 30 minutes.

The heat was removed and the polyamide was allowed to cool, removed from the flask and ground to pass a 3-mm screen. The analytical results were: I.V.=0.40 dL/g; Tg=101.1° C.; Color: L*=92.90, a*=3.22, b*=36.48. NMR confirmed the composition of PDA-10-TPA(MX).

Example 3

This example illustrates the preparation of an amorphous polyamide comprising 90 mole % of 1,3-phenylenedioxydiacetic acid (PDA) and 10 mole % of naphthalenedicarboxylic acid (NDA) with m-xylylenediamine (MX).

To a 500 ml round bottom flask equipped with a short distillation column, a stirrer, and a nitrogen inlet was added 61.02 grams (0.27 moles) of resorcinol bis(carboxymethyl) ether [(1,3-phenylenedioxy)diacetic acid], 6.48 grams (0.03 moles) of 2,6-naphthalenedicarboxylic acid, 40.8 grams (0.30 moles) m-xylylenediamine, and 75.0 (4.17 moles) of water. The flask was immersed in a Belmont metal bath at 170° C. and stirred at 100 RPM. After 10 minutes, the reaction mixture was a white solid and the stirrer was stopped. 22 ml of water had been trapped in a condensation receiver and the temperature set point was increased to 220° C. After 10 minutes, the temperature set point was increased to 275° C. and 40 ml of water had been collected in a condensation receiver. After 7 minutes, the temperature was 263° C., melting of the reaction mixture had begun and the stirrer was started at 25 RPM. 50 ml of water had been trapped in a condensation receiver. After 9 minutes, the temperature was 275° C. and ⅓ of the reaction mixture had melted. The stirring was increased to 50 RPM and 60 ml of water had been trapped in a condensation receiver. After 9 minutes, almost the entire white solid was melted and the stirring was increased to 100 RPM. 62 ml of water had been trapped in a condensation receiver. After 5 minutes, all the white solid had melted and the stirring was reduced to 50 RPM These conditions were held for 30 minutes. The heat was removed and the polyamide was allowed to cool, removed from the flask and ground to pass a 3-mm screen. Analytical results: I.V.=0.39 dL/g; Tg=101.1° C. Color: L*=82.41, a*=2.23, b*=36.62; NMR composition=PDA-10-NDA(MX).

Example 4

Example 4 illustrates the preparation of an amorphous polyamide comprising 82 mol % adipic acid (A) and 18 mol % isophthalic acid (IPA) with m-xylylenediamine (MX).

To a 500 ml round bottom flask equipped with a short distillation column, a stirrer, and a nitrogen inlet was added 46.72 grams (0.32 moles) of adipic acid, 13.28 grams (0.08 moles) of isophthalic acid, 55.5 grams (0.408 moles) of m-xylylenediamine, and 75.0 (4.17 moles) of water. The flask was immersed in a Belmont metal bath at 115° C. and stirred at 100 RPM. After 8 minutes, there was a clear melt with some white unmelts present. The stirring was increased to 200 RPM. These conditions were held for 18 minutes. The temperature set point was increased to 275° C. After 17 minutes, the bath temperature was 168° C., 40 ml of water had been trapped in a condensation receiver and the reaction mixture was a white solid. The stirrer was stopped. After 9 minutes, the bath temperature was 216° C., melting had begun and the stirrer was started at 25 RPM. After 8 minutes, the stirrer set point was increased to 100 RPM. After 11 minutes, the entire solid had melted and 70 ml of water was trapped in a condensation receiver. The stirrer set point was increased to 200 RPM and the bath temperature was 275° C. Vacuum was applied beginning at 300 mm of mercury with gradual reduction to a set point of 0.3 mm over a period of 5 minutes. The stirrer set point was reduced to 100 RPM. As the viscosity of the melt increased, stirring was gradually reduced over a period of 15 minutes to 25 RPM. After a total vacuum time of 20 minutes, vacuum was increased to atmosphere and the heat was removed. The polyamide was allowed to cool, removed from the flask and ground to pass a 3-mm screen. The analytical results were. I.V.=0.83 dL/g; $T_g$=104.1° C.; $T_m$=none; Color: $L^*$=82.15, $a^*$=−1.38, $b^*$=24.15. NMR confirmed the composition of A-19-IPA (MX).

Example 5

Example 5 illustrates the preparation of a polyamide comprising 82 mol % adipic acid (A) and 18 mol % terephthalic acid (TPA) with m-xylylenediamine (MX).

46.72 grams (0.32 moles) of adipic acid, 13.28 grams (0.08 moles) of terephthalic acid, 55.5 grams (0.408 moles) of m-xylylenediamine, and 75.0 (4.17 moles) of water was added to a 500 ml round bottom flask equipped with a short distillation column, a stirrer, and a nitrogen inlet. The flask was immersed in a Belmont metal bath at 115° C. and stirred at 100 RPM. After 12 minutes, a white opaque liquid was present and the stirring was increased to 200 RPM The conditions were held for 18 minutes. The temperature set point was increased to 275° C. After 13 minutes, the bath temperature was 164° C., 30 ml of water had been trapped in a condensation receiver and the reaction mixture was a white solid. The stirrer was stopped. After 10 minutes, the bath temperature was 275° C., melting had begun and the stirrer was started at 25 RPM After 16 minutes, some melting had begun and the stirrer set point was increased to 100 RPM. After 7 minutes, the stirring was increased to 200 RPM After 26 minutes, the entire solid had melted and 65 ml of water was trapped in a condensation receiver. Vacuum was applied beginning at 300 mm of mercury with gradual reduction to a set point of 0.3 mm over a period of 5 minutes. As the viscosity of the melt increased, stirring was gradually recued over a period of 13 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V. 0.80 dL/g; Tg=106.3° C.; $T_m$=none; Color: $L^*$=83.49, $a^*$=−2.49, $b^*$=22.98. NMR composition=A-18-TPA(MX). Oxygen permeability on a compression molded film was 0.17 cc-mil/100 in$^2$-day-atm.

Example 6

This example illustrates the preparation of an amorphous polyamide comprising 82 mole % of adipic acid (A) and 18 mole % of naphthalenedicarboxylic acid (NDA) with m-xylylenediamine (MX).

To a 500 ml round bottom flask equipped with a short distillation column, a stirrer, and a nitrogen inlet was added 46.72 grams (0.32 moles) of adipic acid, 17.28 grams (0.08 moles) of 2,6-naphthalenedicarboxylic, acid, 55.5 grams (0.408 moles) of m-xylylenediamine, and 75.0 (4.17 moles) of water. The flask was immersed in a Belmont metal bath at 115° C. and stirred at 100 RPM. After 12 minutes, a white opaque liquid was present and the stirring was increased to 200 RPM. The conditions were held for 18 minutes. The temperature set point was increased to 275° C. After 13 minutes, the bath temperature was 164° C., 30 ml of water had been trapped in a condensation receiver and the reaction mixture was a white solid. The stirrer was stopped. After 10 minutes, the bath temperature was, 275° C., melting had begun and the stirrer was started at 25 RPM. After 16 minutes, some melting had begun and the stirrer set point was increased to 100 RPM. After 7 minutes, the stirring was increased to 200 RPM. After 26 minutes the entire solid had melted and 65 ml of water was trapped in a condensation receiver. Vacuum was applied beginning at 300 mm of mercury with gradual reduction to a set point of 0.3 mm over a period of 5 minutes. As the viscosity of the melt increased, stirring was gradually reduced over a period of 13 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.80 dL/g, $T_g$=106.3° C.; $T_m$=none; Color: $L^*$=83.49, $a^*$=−2.49, $b^*$=22.98; NMR=A-18-NDA(MX). Oxygen permeability on a compression molded film was 0.17 cc-mils/100in$^2$-day-atm.

Example 7

This example illustrates the preparation of an amorphous polyamide comprising 81 mole % of adipic acid (A) and 19 mole % of phenylindandicarboxylic acid (PIDA) with m-xylylenediamine (MX).

To a 500 ml round bottom flask equipped with a short distillation column, a stirrer, and a nitrogen inlet was added 46.72 grams (0.32 moles) of adipic acid, 25.76 grams (0.08 moles) of 2,6-phenylindandicarboxylic acid, 55.5 grams (0.408 moles) of m-xylylenediamine, and 75.0 (4.17moles) of water. The flask was immersed in a Belmont metal bath at 115° C. and stirred at 25 RPM. After 14 minutes, foaming was present and the stirring was increased to 300 RPM. The conditions were held for 14 minutes and the temperature set point was increased to 140° C. After 9 minutes, the temperature set point was increased to 150° C. and 10 ml of water had been trapped in a condensation receiver. After 3 minutes, the bath temperature was increased to 160° C. and 12 ml had been trapped in a condensation receiver. After 3 minutes, the bath temperature was 275° C. and 15 ml had been trapped in a condensation receiver. After 6 minutes, the bath temperature was 198° C. and 21 ml had been trapped in a condensation receiver. Some slight foaming was still present. After 10 minutes, the bath temperature was 244° C. and 35 ml had been trapped in a condensation receiver. The reaction mix was a white thick paste and the stirring was reduced to 25 RPM. After 16 minutes, the bath temperature was 275° C. and the reaction mix was ½ melted. After 3 minutes, the reaction mix was ¾ melted and 66 ml had been trapped in a condensation receiver. After 5 minutes, the entire paste had melted and vacuum was applied beginning at 500 mm of mercury with gradual reduction to a set point of 0.3 mm over a period of 8 minutes. As the viscosity of the melt increased, stirring was gradually reduced over a period of 12 minutes to 25 RPM. After a total vacuum time of 20 minutes, vacuum was increased to atmosphere and the heat was removed. The polyamide was allowed to cool, removed from the flask and ground to pass a 3-mm screen. The analytical results were: I.V.=0.50 dL/g; $T_g$=109.6° C.; $T_m$=none; Color: $L^*$=78.08, $a^*$=−1.33, $b^*$=19.26; NMR composition of A-19-PIDA(MX).

Example 8

Example 8 illustrates the preparation of one embodiment of a polyamide-clay nanocomposite of this invention.

An amorphous copolyamide prepared as described in Example 5 (1,000 grams of A-20-IPA(MX) with an I.V. of about 0.91 dL/g), and an onium ion-intercalated clay (29.0 grams of CWC-ODA) of Nanocor, Inc., were dry blended and then dried in a vacuum oven with a slight nitrogen sweep at about 75° C. for about 16 hours. The mixture was placed into an AccuRate feeder then extruded at a feed rate of about 3.8 kg/hr on a Leistritz Micro 18 corotating twin screw extruder equipped with a general compounding screw at about 300 RPM with the barrel and die temperatures set at 250° C. and vacuum ventilation. The extrudate was quenched into water then chopped as it exited the die, to give 807 grams of the copolyamide nanocomposite with I.V. of about 0.90 dL/g and having an ash value of about 1.9 weight percent. Analysis by DSC showed a minor melting endotherm of 0.4 cal/g at about 200° C. on the first scan and no melting endotherm was observed on the second scan after cooling at a rate of about 200° C./min.

Example 9

Example 9 illustrates the coextrusion of one embodiment of a polyamide-clay nanocomposite of this invention and poly(ethylene terephthalate) (PET).

The copolyamide nanocomposite from Example 8 (about 700 grams) was dried in a vacuum oven with a slight nitrogen sweep at about 75° C. for about 16 hours PET 9921, of Eastman Chemical Company, was dried separately in a hopper drier at about 120° C. Then the copolyamide nanocomposite and the PET 9921 were co-extruded to form a tri-layer film with the copolyamide nanocomposite comprising the center layer with thickness of about 7.0 mils and with the PET 9921 comprising the two outside layers with a total film thickness of about 21 mils. Several 2-inch square pieces of the tri-layer film were biaxially oriented at a stretch ratio of 4×4 using a T. M. Long instrument.

The oriented film showed excellent color and clarity, with haze of about 0.6%, L* of about 94.6, a* of about −0.9, and b* of about 0.1. Analysis of the oriented film by optical microscopy revealed very few large particles and almost no voids. Oxygen permeability of the film was determined using a Mocon Oxatran 2/20 to be 0.48 cc-mil/100 in$^2$-day-atm, which is significantly better than the control sample in Comparative Example 1, and is better than the polyamide nanocomposite in Comparative Example 2.

Comparative Example 1

The process of Example 9 as repeated except that clay-free MX6 6007, available from Mitsubishi Gas and Chemical Company, was used instead of the copolyamide nanocomposite to give a tri-layer film with total thickness of about 20.5 mils and a center clay-free barrier layer thickness of about 6.0 mils, as extruded.

The oriented film showed good color but elevated haze, with haze of about 2.45%, L* of about 94.7, a* of about −0.09, and b* of about −0.1. Oxygen permeability of the film was determined using a Mocon Oxatran 2/20 to be 0.83 cc-mil/100 in$^2$-day-atm, significantly (0.35 cc-mil/100 in$^2$-day-atm) higher than the film having the nanocomposite center layer of Example 5.

Comparative Example 2

The process of Example 8 as repeated except that MXD6 6007, of Mitsubishi Gas and Chemical Company, was used instead of the copolyamide prepared as described in Example 4.

The process of Example 2 as repeated except that (1) the MXD6 nanocomposite was used instead of the copolyamide nanocomposite and (2) PET 20261, of Eastman Chemical Company, was used instead of PET 9921. The tri-layer film had a total thickness of about 21 mils and a center MXD6 nanocomposite layer thickness of about 1.4 mils.

The oriented film showed elevated haze, with haze of about 2.5%. Analysis of the oriented film by optical microscopy revealed numerous large particles and a significant amount of voids. Oxygen permeability of the film was determined using a Mocon Oxatran 2120 to be 2.81 cc-mil/100 in$^2$-day-atm.

Example 10

A low molecular weight amine terminated copolyamide is prepared as described in Example 4 except that an excess of the xylylenediamine is used, to provide a material with I.V. of about 0.3 dL/g. This material is then used in place of the high I.V. copolyamide in the process of Example 8. After the extrusion is complete, 100 grams of the extrudate pellets ate dry-mixed with 300 grams of MXD6 6007 polyamide pellets, of Mitsubishi Gas and Chemical Company. The MXD6 polyamide possessed a molecular weight of $M_n$=10,000 g/mol, $M_w$=25,000 g/mol, and $M_z$=40,000 g/mol. The mixture is then extruded on the Leistritz extruder under the same conditions as used with the clay polymer mixture but at a feed rate of 2.0 to 2.5 kg/hour. The resulting copolyamide nanocomposite is found to provide tri-layer film with excellent appearance and oxygen barrier.

Example 11

The process of Example 4 was repeated except that an onium ion intercalated clay (29.0 grams of CWC-ODA) of Nanocor, Inc., was also charged to the flask prior to the addition of the m-xylylenediamine. The resulting copolyamide nanocomposite is found to provide tri-layer film with excellent appearance and oxygen barrier.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polyamide-clay intercalate comprising a layered clay material intercalated with an amorphous polyamide comprising (i) a residue of a dicarboxylic acid component comprising at least one diacid and (ii) a residue of at least one diamine component, wherein at least two diacids or at least two diamine components are used to form the polyamide; and wherein at least one of the diamine components includes an aromatic group, or at least two of the diacids are aromatic.

2. The intercalate of claim 1, wherein component (i) comprises at least two dicarboxylic acids selected from the group consisting of an aromatic dicarboxylic acid having 8 to 14 carbon atoms, an aliphatic dicarboxylic acid having 4 to 12 carbon atoms, and a cycloaliphatic dicarboxylic acid having 8 to 12 carbon atoms.

3. The intercalate of claim 1, wherein component (i) comprises at least two dicarboxylic acids selected from the group consisting of phthalic acid; isophthalic acid; terephthalic acid; 1,4-cyclohexanedicarboxylic acid; naphthalene-2,6-dicarboxylic acid; cyclohexanediacetic acid; diphenyl-4,4'-dicarboxylic acid; sebacic acid; succinic acid; adipic acid; glutaric acid; azelaic acid; 1,3-phenylenedioxydiacetic acid; iminodiacetic acid; oxydiacetic acid; thiodiacetic acid; 1,4-phenylenedioxydiacetic acid, and phenylindane dicarboxylic acid.

4. The intercalate of claim 1, wherein component (i) comprises at least two dicarboxylic acids selected from the group consisting of adipic acid; naphthalene-2,6-dicarboxylic acid; isophthalic acid; terephthalic acid; 1,3-phenylenedioxydiacetic acid; 1,4-cyclohexanedicarboxylic acid; and phenylindane dicarboxylic acid.

5. The intercalate of claim 1 wherein component (ii) is selected from the group consisting of 1,2-ethylenediamine, 1,3-propylenediamine, 1,6-hexamethylenediamine, 1,12-dodecylenediamine, 1,4-cyclohexanebismethylamine, piperazine, p-xylylenediamine, m-xylylenediamine, and a mixture thereof.

6. The intercalate of claim 1, wherein component (ii) comprises m-xylylenediamine.

7. The intercalate of claim 1, wherein about 5% to about 85% by weight of the polyamide is intercalated into the layered clay material.

8. The intercalate of claim 1, wherein about 30% to about 50% by weight of the polyamide is intercalated into the layered clay material.

9. The intercalate of claim 1, wherein the layered clay material is selected from the group consisting of montmorillonite, saponite, hectorite, mica, vermiculite, bentonite, nontronite, beidellite, volkonskoite, magadite, kenyaite, and a mixture thereof.

10. The intercalate of claim 1, wherein the layered clay material comprises a smectite clay.

11. The intercalate of claim 1, wherein the layered clay material is a free flowing powder having a cation exchange capacity from about 0.9 to about 1.5 meq/g, and is selected from the group consisting of sodium montmorillonite, sodium bentonite, calcium montmorillonite, calcium bentonite, and mixtures thereof.

12. The intercalate of claim 1, wherein the intercalate is sheared to form a plurality of individual clay platelet particles and tactoids having a thickness of less than or equal to 30 nm.

13. The intercalate of claim 1, wherein the clay material is treated with a material selected from the group consisting of water soluble or insoluble polymer, an organic reagent or monomer, a silane compound, a metal, an organometallic, an organic cation to effect cation exchange, and a combination thereof.

14. The intercalate of claim 13, wherein the organic cation is derived from an onium salt compound.

15. The intercalate of claim 14, wherein the onium salt compound is selected from the group consisting of an ammonium salt compound; a phosphonium salt compound; and a mixture thereof.

16. The intercalate of claim 13, wherein the organic cation is selected from the group consisting of an alkyl ammonium ions; an alkyl phosphonium ion; a polyalkoxylated ammonium ion; and a mixture thereof.

17. The intercalate of claim 1, wherein component (i) is selected from the group consisting of adipic acid; naphthalene-2,6-dicarboxylic acid; isophthalic acid; terephthalic acid; 1,3-phenylenedioxydiacetic acid; 1,4-cyclohexanedicarboxylic acid; phenylindane dicarboxylic acid; and a mixture thereof; component (ii) comprises m-xylylenediamine; and the layered clay material is selected from the group consisting of sodium montmorillonite, sodium bentonite, and a mixture thereof, treated with an organic cation to effect cation exchange.

18. An exfoliated layered clay material comprising a plurality of individual platelets obtained by shearing the intercalate of claim 1.

19. The intercalate of claim 1, capable of admixture with a matrix polymer of component (ii) to form a nanocomposite having a gas permeability which is at least 10 percent lower than that of an article formed from a clay-free polyamide.

20. The intercalate of claim 1, wherein the diamine component includes an aromatic group wherein an alkylene group is interposed between an amino group and an aromatic ring.

21. A polyamide-clay intercalate comprising a layered clay material, wherein the clay material is intercalated with an amorphous matrix polyamide-compatible oligomeric resin comprising (i) a residue of at least two dicarboxylic acid components and (ii) a residue of at least one diamine component, and wherein if the diamine component does not include an aromatic group, at least two of the dicarboxylic acids are aromatic.

22. The intercalate of claim 21, wherein the diamine component includes an aromatic group wherein an alkylene group is interposed between an amino group and an aromatic ring.

23. A process for preparing an amorphous polyamide-clay intercalate comprising the steps of melt mixing a layered clay material with a polyamide-compatible oligomeric resin comprising (i) a residue of at least two dicarboxylic acid components and (ii) a residue of at least one diamine component to form an oligomeric resin-clay intercalate; and wherein at least one of the diamine components includes an aromatic group, or at least two of the diacids are aromatic.

24. The process of claim 23, wherein intercalation is conducted by a batch mixing or a melt compounding extrusion process.

25. The process of claim 23, wherein the oligomeric resin is an oligomeric polyamide.

26. An intercalate material produced by the process of claim 23.

27. The intercalate of claim 23, which when added to a high molecular weight amorphous matrix polyamide, produces a nanocomposite having a gas permeability that is at least 10 percent lower than that of unmodified polymer.

28. The process of claim 23, wherein the diamine component includes an aromatic group wherein an alkylene group is interposed between an amino group and an aromatic ring.

29. A process for preparing an amorphous polyamide-clay intercalate comprising the steps of:
  (a) adding a layered clay material to a mixture of (i) at least two dicarboxylic acid components and (ii) a diamine component of an amorphous polyamide to intercalate the dicarboxylic acids and the diamine component between adjacent layers of the layered clay material, and wherein if the diamine component does not include an aromatic group, at least two of the dicarboxylic acids are aromatic, and
  (b) conducting the polycondensation polymerization of components (i) and (ii) while intercalated.

30. The process of claim 29, wherein component (i) is selected from the group consisting of adipic acid; naphthalene-2,6-dicarboxylic acid; isophthalic acid; terephthalic acid; 1,3-phenylenedioxydiacetic acid; 1,4-cyclohexanedicarboxylic acid; and phenylindane dicarboxylic acid.

31. The process of claim 29, wherein component (ii) is selected from the group consisting of 1,2-ethylenediamine; 1,3-propylenediamine; 1,6-hexamethylenediamine; 1,12-dodecylenediamine; 1,4-cyclohexane-bismethylamine; piperazine; p-xylylenediamine; m-xylylenediamine; and a mixture thereof.

32. The process of claim 29, wherein component (ii) comprises m-xylylenediamine.

33. The process of claim 29, wherein the layered clay material comprises a clay material selected from the group consisting of montmorillonite, saponite, hectorite, mica, vermiculite, bentonite, nontronite, beidellite, volkonskoite, magadite, kenyaite, and a mixture thereof.

34. The process of claim 29, wherein the layered clay material is selected from the group consisting of sodium montmorillonite; sodium bentonite; and a mixture thereof.

35. The process of claim 29, wherein the layered clay material is contacted with a material selected from the group consisting of a polymer; an organic reagent; an organic monomer; a silane compound; a metal; an organometallic cation; an organic cation; and a combination thereof.

36. The process of claim 35, wherein the organic cation is derived from an onium salt compound.

37. The process of claim 36, wherein the onium salt compound is selected from the group consisting of an ammonium salt compound; a phosphonium salt compound; and a mixture thereof.

38. An intercalate material produced by the process of claim 29.

39. An exfoliated layered clay material including a plurality of individual platelets formed by shearing the intercalate produced by the process of claim 29.

40. The process of claim 29, wherein the diamine component includes an aromatic group wherein an alkylene group is interposed between an amino group and an aromatic ring.

* * * * *